United States Patent
Kharait

(10) Patent No.: US 10,893,690 B2
(45) Date of Patent: *Jan. 19, 2021

(54) COMPOSITIONS FOR PREPARING SPORTS REHYDRATION DRINK

(71) Applicant: IGH NATURALS, INC., Rocklin, CA (US)

(72) Inventor: Sourabh Kharait, Roseville, CA (US)

(73) Assignee: IGH NATURALS, INC., Rocklin, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 16/184,806

(22) Filed: Nov. 8, 2018

(65) Prior Publication Data

US 2019/0364931 A1 Dec. 5, 2019

Related U.S. Application Data

(63) Continuation-in-part of application No. 15/997,409, filed on Jun. 4, 2018, now Pat. No. 10,143,223.

(51) Int. Cl.
| | | |
|---|---|---|
| A23L 2/39 | (2006.01) |
| A23L 2/60 | (2006.01) |
| A23L 2/58 | (2006.01) |
| A23L 2/56 | (2006.01) |
| A23L 33/125 | (2016.01) |
| A23L 33/15 | (2016.01) |
| A23L 33/16 | (2016.01) |
| A23L 33/105 | (2016.01) |

(52) U.S. Cl.
CPC ...... *A23L 2/39* (2013.01); *A23L 2/56* (2013.01); *A23L 2/58* (2013.01); *A23L 2/60* (2013.01); *A23L 33/105* (2016.08); *A23L 33/125* (2016.08); *A23L 33/15* (2016.08); *A23L 33/16* (2016.08); *A23V 2002/00* (2013.01)

(58) Field of Classification Search
CPC .......... A23L 2/39; A23L 33/105; A23L 33/16; A23L 33/125; A23L 33/15; A23L 2/56; A23L 2/58; A23L 2/60
USPC ........................ 426/74, 548, 648, 590, 443
See application file for complete search history.

(56) References Cited

U.S. PATENT DOCUMENTS

2014/0220221 A1 * 8/2014 Del Pozo

* cited by examiner

*Primary Examiner* — Helen F Heggestad
(74) *Attorney, Agent, or Firm* — Sheppard Mullin Richter & Hampton LLP

(57) ABSTRACT

The present disclosure relates generally to sports drinks with improved ability to rehydrate individuals especially after intense physical activities. Compositions for preparing the drinks are also provided. The sports drinks can also reduce muscle soreness or fatigue, improve muscle performance, and minimize muscle cramping.

15 Claims, No Drawings

COMPOSITIONS FOR PREPARING SPORTS REHYDRATION DRINK

CROSS REFERENCE TO RELATED APPLICATIONS

This application is a continuation-in-part of U.S. application Ser. No. 15/997,409, filed Jun. 4, 2018, the content of which is incorporated by reference in its entirety into the present disclosure.

BACKGROUND

Sports drinks have been developed to assist with the losses of various nutritional components during physical activity. The nutritional components may include sugars, electrolytes, vitamins, minerals, amino acids, and proteins. Physical activity includes not only exercise and sports by healthy individuals, but may also include any activity where important nutrients are lost, such as work by factory or farm workers, activity by chronically ill patients, living in harsh conditions such as in the tropics or in the desert, and so forth.

Following exercise, replenishing the lost water and nutrients has been the goal of a few decades of sports drink research. Nutritional intervention to achieve maximum muscle recovery has been primarily directed toward restoration of fluid and electrolytes or the replenishment of muscle glycogen stores. Muscle recovery depends on four major factors, namely, restoration of fluid and electrolytes, replenishment of muscle glycogen, reduction of oxidative and muscle stress, and rebuilding and repair of muscle protein damaged.

Typically marketed sports drinks contain sugars and electrolytes. Some examples of the sugars contained in the sports drinks include sucrose, glucose, or fructose. Typical electrolytes include sodium salts, potassium salts, and chloride salts.

SUMMARY

The present disclosure, in one embodiment, provides sports drinks with improved ability to rehydrate individuals especially before or after intense physical activities. Further, the disclosed sports drinks can reduce muscle soreness or fatigue, improve muscle performance, and minimize muscle cramping. Such improved characteristics of the sports drinks, which are contemplated to be associated with well-balanced magnesium content and magnesium/potassium ratio, surprisingly can be formulated with desirable flavor for people.

In one embodiment, therefore, the present disclosure provides a drinkable aqueous solution comprising, per 16 fluid ounces (473 mL) of the solution: 50 to 400 mg $Mg^{2+}$; 100 to 300 mg $Na^+$; 100 to 200 mg $K^+$; 2-10 grams sugar; 50 to 200 mg stevia extract; 2-10 mg monk fruit extract; and at least 450 mL water, wherein the solution has an osmolarity below 250 mosmoles per liter (mOsm/L), the ratio of $Mg^{2+}$ to $K^+$ is from 1:3 to 2:1, and the ratio of stevia extract to monk fruit extract is from 50:1 to 5:1. In some embodiments, the osmolarity is below 220 mOsm/L. In some embodiments, the osmolarity is from 50 to 200 mOsm/L.

In some embodiments, the ratio of $Mg^{2+}$ to $K^+$ is from 1:2 to 1:1. In some embodiments, the ratio of stevia extract to monk fruit extract is from 25:1 to 10:1. In some embodiments, the solution comprises 50-200 mg of the $Mg^{2+}$ per 16 fluid ounces of the solution.

In some embodiments, the solution comprises, per 16 fluid ounces of the solution: 70 to 150 mg $Mg^{2+}$; 150 to 250 mg $Na^+$; 125 to 175 mg $K^+$; 4-6 grams sugar; 80 to 120 mg stevia extract; and 4-6 mg monk fruit extract. In some embodiments, the solution comprises, per 16 fluid ounces of the solution: about 100 mg $Mg^{2+}$; about 200 mg $Na^+$; about 150 mg $K^+$; about 5 grams sugar; about 100 mg stevia extract; and about 5 mg monk fruit extract.

In some embodiments, the solution further comprises vitamin C, citric acid, and a flavoring agent. In some embodiments, the solution comprises the ingredients as shown in Table 1, 2, or 3.

Also provided, in one embodiment, is a method for reducing muscle soreness, fatigue or cramping in a subject in need thereof, comprising orally administering to the subject an effective amount of the solution of the present disclosure. In some embodiments, the administration follows an intense physical activity by the subject. In some embodiments, the subject experiences muscle soreness, fatigue, or cramping. In some embodiments, the administration is prior to the subject undertaking an intense physical activity.

Compositions are also provided that, when dissolved in water, can prepare a drink of the present disclosure.

DETAILED DESCRIPTION

The following description sets forth exemplary embodiments of the present technology. It should be recognized, however, that such description is not intended as a limitation on the scope of the present disclosure but is instead provided as a description of exemplary embodiments.

The instant inventor has made the unexpected discovery that suitable concentrations of magnesium, sodium and potassium ions in a sports drink, in particular a relatively high concentration of magnesium and a balanced magnesium to potassium ratio, when used by an individual engaged in intense physical activities, help reduce muscle soreness and fatigue, improve muscle performance, and minimize muscle cramping. A suitable concentration of magnesium may be 50 to 400 mg $Mg^{2+}$ per 16 fluid ounces (473 mL) of the drink (about 0.1 mg/mL to about 0.85 mg/mL). A suitable ratio of magnesium to potassium may be 1:3 to 2:1 (w/w).

In addition, it is contemplated that the sports drink contains relatively low sugar content to reduce osmolarity. In some embodiments, the preferred osmolarity is below 250 mosmoles per liter (mOsm/L), or below 200 mOsm/L. Magnesium drinks (e.g., magnesium citrate) are known to pull fluid from the body. Therefore, the lower osmolarity than in common products on the market helps to improve rehydration.

A common problem associated with drinks with high content of magnesium is their sour taste. Efforts have been made to neutralize this taste, and it is herein discovered that a combination of stevia extract and monk fruit extract, at the right ratio (e.g., 50:1 to 5:1, w/w), can help remove the disfavored taste.

In accordance with one embodiment of the present disclosure, therefore, provided is a drinkable aqueous solution comprising, per 16 fluid ounces (473 mL) of the solution, 50 to 400 mg $Mg^{2+}$; 100 to 300 mg $Na^+$; 100 to 200 mg $K^+$; 2-10 grams sugar; 50 to 200 mg stevia extract; 2-10 mg monk fruit extract; and at least 450 mL water. Preferably, the solution has an osmolarity below 250 mosmoles per liter (mOsm/L). In some embodiments, the ratio of $Mg^{2+}$ to $K^+$ is from 1:3 to 2:1 (w/w). In some embodiments, the ratio of stevia extract to monk fruit extract is from 50:1 to 5:1 (w/w).

The osmolarity of the solution is preferably lower than 250 mOsm/L. In some embodiments, the osmolarity is below 240 mOsm/L, 230 mOsm/L, 220 mOsm/L, 210 mOsm/L, 200 mOsm/L, 190 mOsm/L, 180 mOsm/L, 170 mOsm/L, 160 mOsm/L, 150 mOsm/L, 140 mOsm/L, 130 mOsm/L, 120 mOsm/L, 110 mOsm/L, 100 mOsm/L, 90 mOsm/L, 80 mOsm/L, 70 mOsm/L, 60 mOsm/L, 50 mOsm/L, 40 mOsm/L, 30 mOsm/L, 20 mOsm/L, 15 mOsm/L, 10 mOsm/L, 9 mOsm/L, 8 mOsm/L, 7 mOsm/L, 6 mOsm/L, 5 mOsm/L, 4 mOsm/L, 3 mOsm/L, 2 mOsm/L, or 1 mOsm/L.

In some embodiments, the osmolarity is higher than 1 mOsm/L, 2 mOsm/L, 5 mOsm/L, 10 mOsm/L, 15 mOsm/L, 20 mOsm/L, 30 mOsm/L, 40 mOsm/L, 50 mOsm/L, 70 mOsm/L, 80 mOsm/L, 90 mOsm/L, or 100 mOsm/L.

The ratio of $Mg^{2+}$ to $K^+$ is preferably from 1:3 to 2:1, or from 1:2 to 2:1, from 2:3 to 1:1, from 1:3 to 3:2, or from 1:3 to 1:1 (w/w). In some embodiments, the ratio of $Mg^{2+}$ to $K^+$ is about 1:1, 1:2, 2:3 or 3:4 (w/w).

The ratio of stevia extract to monk fruit extract is preferably from 50:1 to 5:1, or alternatively from 45:1 to 5:1, 40:1 to 5:1, 35:1 to 5:1, 30:1 to 25:1, 20:1 to 5:1, 45:1 to 6:1, 45:1 to 7:1, 45:1 to 8:1, 45:1 to 9:1, 45:1 to 10:1, 45:1 to 11:1, 45:1 to 12:1, 45:1 to 13:1, 45:1 to 14:1, 45:1 to 15:1, 45:1 to 16:1, 45:1 to 17:1, 45:1 to 18:1, 45:1 to 19:1, 45:1 to 20:1, 40:1 to 6:1, 40:1 to 7:1, 40:1 to 8:1, 40:1 to 9:1, 40:1 to 10:1, 40:1 to 11:1, 40:1 to 12:1, 40:1 to 13:1, 40:1 to 14:1, 40:1 to 15:1, 40:1 to 16:1, 40:1 to 17:1, 40:1 to 18:1, 40:1 to 19:1, 40:1 to 20:1, 30:1 to 6:1, 30:1 to 7:1, 30:1 to 8:1, 30:1 to 9:1, 30:1 to 10:1, 30:1 to 11:1, 30:1 to 12:1, 30:1 to 13:1, 30:1 to 14:1, 30:1 to 15:1, 30:1 to 16:1, 30:1 to 17:1, 30:1 to 18:1, 30:1 to 19:1, 30:1 to 20:1, 25:1 to 6:1, 25:1 to 7:1, 25:1 to 8:1, 25:1 to 9:1, 25:1 to 10:1, 25:1 to 11:1, 25:1 to 12:1, 25:1 to 13:1, 25:1 to 14:1, 25:1 to 15:1, 25:1 to 16:1, 25:1 to 17:1, 25:1 to 18:1, 25:1 to 19:1, or 25:1 to 20:1.

Stevia is a sweetener and sugar substitute extracted from the leaves of the plant species *Stevia rebaudiana*. The active compounds of stevia include steviol glycosides (mainly stevioside and rebaudioside). Stevia's taste has a slower onset and longer duration than that of sugar, and some of its extracts may have a bitter or licorice-like aftertaste at high concentrations.

Stevia extracts and derivatives are produced industrially and available commercially. Example include Rebiana, which is an abbreviated name rebaudioside A, and Truvia and PureVia which are an Erythritol, Rebiana.

Monk fruit (*Siraitia grosvenorii*) is a herbaceous perennial vine of the Cucurbitaceae (gourd) family, native to southern China and northern Thailand. The plant is cultivated for its fruit, whose extract is nearly 300 times sweeter than sugar and has been used in China as a low-calorie sweetener for cooling drinks and in traditional Chinese medicine. Monk fruit extracts are also commercially available.

In some embodiment, the solution contains 50 to 400 mg $Mg^{2+}$, or alternatively 50 to 350 mg $Mg^{2+}$, 50 to 300 mg $Mg^{2+}$, 50 to 250 mg $Mg^{2+}$, 50 to 200 mg $Mg^{2+}$, 50 to 150 mg $Mg^{2+}$, 75 to 400 mg $Mg^{2+}$, 75 to 300 mg $Mg^{2+}$, 75 to 250 mg $Mg^{2+}$, 75 to 200 mg $Mg^{2+}$, 75 to 150 mg $Mg^{2+}$, or 75 to 125 mg $Mg^{2+}$, per 16 fluid ounces (473 mL) of the solution. The magnesium ion can be provided as a salt of magnesium, such as magnesium citrate, magnesium chloride, without limitation.

In some embodiments, the solution contains 100 to 300 mg $Na^+$, or alternatively 100 to 250 mg $Na^+$, 100 to 225 mg $Na^+$, 100 to 200 mg $Na^+$, 125 to 300 mg $Na^+$, 150 to 300 mg $Na^+$, 175 to 300 mg $Na^+$, 125 to 250 mg $Na^+$, 150 to 250 mg $Na^+$, or 175 to 225 mg $Na^+$, per 16 fluid ounces (473 mL) of the solution. The sodium ion can be provided as a salt of sodium, such as sodium citrate, sodium chloride, without limitation.

In some embodiments, the solution contains 100 to 200 mg $K^+$, or alternatively 110 to 200 mg $K^+$, 120 to 200 mg $K^+$, 130 to 200 mg $K^+$, 140 to 200 mg $K^+$, 150 to 200 mg $K^+$, 100 to 190 mg $K^+$, 100 to 180 mg $K^+$, 100 to 170 mg $K^+$, 100 to 160 mg $K^+$, 110 to 190 mg $K^+$, 120 to 180 mg $K^+$, 130 to 170 mg $K^+$, 140 to 160 mg $K^+$, or 145 to 155 mg $K^+$, per 16 fluid ounces (473 mL) of the solution. The potassium ion can be provided as a salt of potassium, such as potassium citrate, potassium chloride, without limitation.

In one embodiment, the solution contains, per 16 fluid ounces of the solution 70 to 150 mg $Mg^{2+}$, 150 to 250 mg $Na^+$; 125 to 175 mg $K^+$; 4-6 grams sugar; 80 to 120 mg stevia extract; and 4-6 mg monk fruit extract. In one embodiment, the solution contains, per 16 fluid ounces of the solution about 100 mg $Mg^{2+}$; about 200 mg $Na^+$; about 150 mg $K^+$; about 5 grams sugar; about 100 mg stevia extract; and about 5 mg monk fruit extract.

The solution can further include other nutrients or flavoring agents such as vitamin C, citric acid, and/or lime/orange flavoring agent.

Specific examples of solutions disclosed here include, without limitation, those provided in Tables 1, 2 or 3 in the experimental examples.

Compositions (e.g., powder) are also provided that, when dissolved in water, can prepare a drink of the present disclosure.

For instance, in one embodiment, provided is a composition (e.g., powder) that comprises, per 8500 mg of total weight, 490 to 2600 mg magnesium citrate; 270 to 800 mg sodium chloride; 290 to 580 mg potassium citrate; 2-8 grams sugar; 80 to 120 mg stevia extract; and 4-6 mg monk fruit extract.

In another embodiment, the composition comprises, per 8500 mg of total weight, 650 to 2600 mg magnesium citrate; 400 to 800 mg sodium chloride; 360 to 580 mg potassium citrate; 4-6 grams sugar; 80 to 120 mg stevia extract; and 4-6 mg monk fruit extract.

In some embodiments, the composition comprises 5.8% to 30.6% w/w magnesium citrate; 3.2% to 9.4% w/w mg sodium chloride; 3.4% to 6.8% w/w mg potassium citrate; 23.5% to 80% w/w grams sugar; 0.94% to 1.4% w/w stevia extract; and 0.047% to 0.07% w/w monk fruit extract.

Methods for preparing and using the aqueous solutions of the present disclosure are also provided. In some embodiments, the solutions can be prepared by adding each of the ingredients into a water-based solution, as exemplified in Example 2.

In various embodiments, the solutions disclosed herein can be used in methods for reducing muscle soreness, fatigue or cramping in a subject in need thereof. The method, in some embodiments, entails orally administering to the subject an effective amount of the solution of the present disclosure.

In some embodiments, the administration follows an intense physical activity by the subject. In one embodiment, the administration is made before an intense physical activity by the subject.

In some embodiments, the effective amount is about 1 fluid ounce, 2 fluid ounces, 5 fluid ounces, 10 fluid ounces, 16 fluid ounces, 18 fluid ounces, or 32 fluid ounces, without limitation.

In some embodiments, the subject experiences muscle soreness, fatigue, or cramping. In some embodiments, the subject, following the administration, experiences reduced muscle soreness, fatigue or cramping. In some embodiment, the subject desires the flavor of the solution.

EXAMPLES

The following examples are included to demonstrate specific embodiments of the disclosure. It should be appreciated by those of skill in the art that the techniques disclosed in the examples which follow represent techniques to function well in the practice of the disclosure, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the disclosure.

Example 1

A batch of test samples of a sport drink was prepared with ingredient shown in Table 1.

TABLE 1

Ingredients of Test Sample

| Ingredients | Amount |
|---|---|
| Magnesium | 100 mg |
| Sodium | 200 mg |
| Potassium | 150 mg |
| Sugars | 5 g |
| Water | q.v. 473 mL |

The test samples were provided to six mixed martial artists. Each of them drank about 2 bottles each (16 fl. oz/bottle) during a 45 minute strenuous endurance work out. The unanimous opinion of all of these individuals was that the drink significantly improved their performance during their workouts, and reduced post-exercise muscle soreness and fatigue. All of these individuals had several comments on social media about how the drink can help athletes rehydrate better.

During the same period, two additional adults and a 8-year boy took the test samples to Zion national park in Utah. They used it to hydrate themselves on a 5-mile hike in the canyons in 92 degree heat. All three of them felt marked difference in their muscle performance and felt relatively energetic despite the long hike. Specifically, they did not feel exhausted despite a relatively long climb in the middle of a hot day. There was minimal muscle soreness or cramps afterwards. They attributed this to the proper formulation of electrolytes they used to hydrate themselves.

A fitness and training coach, who ran the marathon, reported that he ran his personal best the day he used the drink and felt the drink specifically improved his performance.

A number of professional basketball (NBA) players tried the drink pre and post workout. Their overall impression was the same as above: less muscle soreness or fatigue, improved muscle performance, minimal cramping.

Example 2

Production samples were prepared with two different flavors, a lemon flavor and an orange flavor. The samples included different amounts of flavor agents, stevia extract and monk fruit extract. It was discovered that, when the amounts of stevia extract and monk fruit extract were 100 mg and 5 mg, respectively (in 16 fluid ounces formulations), the samples had the least "magnesium taste" and were most enjoyable. The corresponding formulations are then provided in the tables below.

TABLE 2

Lime flavored production sample

| Ingredient | Amount | Unit |
|---|---|---|
| Organic Sugar | 5000 | mg |
| Magnesium Citrate | 656.25 | mg (100 mg $Mg^{2+}$) |
| Sodium Chloride | 538.46 | mg (200 mg $Na^+$) |
| Potassium Citrate | 437.5 | mg (150 mg $K^+$) |
| Vitamin C Ascorbic Acid | 90 | mg |
| Citric Acid | 1200 | mg |
| Stevia Extract | 100 | mg |
| Flavor Lime Li-17212 | 500 | mg |
| Color Beta Carotene Emulsion 16 | 7.2 | mg |
| Monk Fruit Extract | 5 | mg |
| Filtered Water | q.v. 473 | mL |

TABLE 3

Orange flavored production sample

| Ingredient | Amount | Unit |
|---|---|---|
| Organic Sugar | 5000 | mg |
| Magnesium Citrate | 656.25 | mg (100 mg $Mg^{2+}$) |
| Sodium Chloride | 538.46 | mg (200 mg $Na^+$) |
| Potassium Citrate | 437.5 | mg (150 mg $K^+$) |
| Vitamin C Ascorbic Acid | 90 | mg |
| Citric Acid | 1200 | mg |
| Stevia Extract | 100 | mg |
| Flavor Blend Orange | 650 | mg |
| Color Blend Beta Carotene Emulsion 16, Rose Anthocyanin | 90 | mg |
| Monk Fruit Extract | 5 | mg |
| Filtered Water | q.v. 473 | mL |

The production samples were prepared with the following process:
1. Fill blending tank with the total water;
2. Add Citric Acid;
3. Add Magnesium Citrate, Sodium Chloride, Potassium Citrate;
4. Add Organic Sugar, Monk Fruit, Stevia, Ascorbic Acid, Natural Flavors and Colors;
5. Blend for 15 minutes until liquid is uniform;
6. Verify pH of final blend≤4. and Brix 1-2.

Unless otherwise defined, all technical and scientific terms used herein have the same meaning as commonly understood by one of ordinary skill in the art to which this invention belongs.

The inventions illustratively described herein may suitably be practiced in the absence of any element or elements, limitation or limitations, not specifically disclosed herein. Thus, for example, the terms "comprising", "including," "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed.

Thus, it should be understood that although the present invention has been specifically disclosed by preferred embodiments and optional features, modification, improvement and variation of the inventions embodied therein herein disclosed may be resorted to by those skilled in the art, and that such modifications, improvements and variations are considered to be within the scope of this invention. The materials, methods, and examples provided here are representative of preferred embodiments, are exemplary, and are not intended as limitations on the scope of the invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

In addition, where features or aspects of the invention are described in terms of Markush groups, those skilled in the art will recognize that the invention is also thereby described in terms of any individual member or subgroup of members of the Markush group.

All publications, patent applications, patents, and other references mentioned herein are expressly incorporated by reference in their entirety, to the same extent as if each were incorporated by reference individually. In case of conflict, the present specification, including definitions, will control.

It is to be understood that while the disclosure has been described in conjunction with the above embodiments, that the foregoing description and examples are intended to illustrate and not limit the scope of the disclosure. Other aspects, advantages and modifications within the scope of the disclosure will be apparent to those skilled in the art to which the disclosure pertains.

The invention claimed is:

1. A solid composition which, when dissolved in a suitable amount of water, can form a drinkable aqueous solution, wherein the drinkable aqueous solution comprises, per 16 fluid ounces (473 mL) of the solution:
   75 to 400 mg $Mg^{2+}$;
   100 to 300 mg $Na^+$;
   100 to 200 mg $K^+$;
   2-10 grams sugar;
   80 to 120 mg stevia extract;
   4-6 mg monk fruit extract; and
   at least 450 mL water,
   wherein the solution has an osmolarity below 250 mosmoles per liter (mOsm/L).

2. The solid composition of claim 1, wherein the osmolarity of the drinkable aqueous solution is below 220 mOsm/L.

3. The solid composition of claim 1, wherein the osmolarity of the drinkable aqueous solution is from 50 to 200 mOsm/L.

4. The solid composition of claim 1, wherein the ratio of $Mg^{2+}$ to $K^+$ in the drinkable aqueous solution is from 1:2 to 1:1.

5. The solid composition of claim 1, wherein the ratio of stevia extract to monk fruit extract in the drinkable aqueous solution is from 25:1 to 15:1.

6. The solid composition of claim 1, wherein the drinkable aqueous solution comprises 75-200 mg of the $Mg^{2+}$ per 16 fluid ounces of the solution.

7. The solid composition of claim 1, wherein the drinkable aqueous solution comprises, per 16 fluid ounces of the solution:
   75 to 150 mg $Mg^{2+}$;
   150 to 250 mg $Na^+$;
   125 to 175 mg $K^+$;
   4-6 grams sugar;
   80 to 120 mg stevia extract; and
   4-6 mg monk fruit extract.

8. The solid composition of claim 1, wherein the drinkable aqueous solution comprises, per 16 fluid ounces of the solution:
   about 100 mg $Mg^{2+}$;
   about 200 mg $Na^+$;
   about 150 mg $K^+$;
   about 5 grams sugar;
   about 100 mg stevia extract; and
   about 5 mg monk fruit extract.

9. The solid composition of claim 1, further comprising vitamin C and citric acid.

10. The solid composition of claim 1, which comprises, per 8500 mg of total weight:

| Ingredient | Amount | Unit |
| --- | --- | --- |
| Organic Sugar | 5000 | mg |
| Magnesium Citrate | 656.25 | mg |
| Sodium Chloride | 538.46 | mg |
| Potassium Citrate | 437.5 | mg |
| Vitamin C Ascorbic Acid | 90 | mg |
| Citric Acid | 1200 | mg |
| *Stevia* Extract | 100 | mg |
| Flavor Lime Li-17212 | 500 | mg |
| Color Beta Carotene Emulsion 16 | 7.2 | mg |
| Monk Fruit Extract | 5 | mg |

11. The solid composition of claim 1, which comprises, per 8500 mg of total weight:

| Ingredient | Amount | Unit |
| --- | --- | --- |
| Organic Sugar | 5000 | mg |
| Magnesium Citrate | 656.25 | mg |
| Sodium Chloride | 538.46 | mg |
| Potassium Citrate | 437.5 | mg |
| Vitamin C Ascorbic Acid | 90 | mg |
| Citric Acid | 1200 | mg |
| *Stevia* Extract | 100 | mg |
| Flavor Blend Orange | 650 | mg |
| Color Blend Beta Carotene Emulsion 16, Rose Anthocyanin | 90 | mg |
| Monk Fruit Extract | 5 | mg |

12. The solid composition of claim 1, which is in the form of powder.

13. A powder comprising, per 8500 mg of total weight,
   490 to 2600 mg magnesium citrate;
   270 to 800 mg sodium chloride;
   290 to 580 mg potassium citrate;
   2-8 grams sugar;
   80 to 120 mg stevia extract; and
   4-6 mg monk fruit extract.

14. The powder of claim 13, which comprises per 8500 mg of total weight,
   650 to 2600 mg magnesium citrate;
   400 to 800 mg sodium chloride;
   360 to 580 mg potassium citrate;
   4-6 grams sugar;
   80 to 120 mg stevia extract; and
   4-6 mg monk fruit extract.

15. A powder comprising:
   5.8% to 30.6% w/w magnesium citrate;

3.2% to 9.4% w/w mg sodium chloride;
3.4% to 6.8% w/w mg potassium citrate;
23.5% to 80% w/w grams sugar;
0.94% to 1.4% w/w stevia extract; and
0.047% to 0.07% w/w monk fruit extract.

\* \* \* \* \*